United States Patent Office 3,471,585
Patented Oct. 7, 1969

3,471,585
PRODUCTION OF CONJUGATED DIOLEFINES
Stuart Neil Dancer, Leatherhead, England, assignor to The Distillers Company Limited, Edinburgh, Scotland, a British company
No Drawing. Filed Oct. 12, 1966, Ser. No. 586,026
Claims priority, application Great Britain, Nov. 5, 1965, 46,962/65
Int. Cl. C07c *5/18;* B01j *11/32*
U.S. Cl. 260—680          7 Claims

ABSTRACT OF THE DISCLOSURE

A process for preparing conjugated diolefines from a mono-olefine containing not less than 4 carbon atoms in the vapor phase with molecular oxygen in the presence of a solid catalyst at a temperature of at least 425° C. and at a pressure in the range of from 1 to 5 p.s.i.g.

---

The present invention relates to a process for the production of conjugated diolefines.

British patent specification No. 902,952 describes and claims a process for the production of a conjugated diolefine e.g. butadiene or isoprene by the reaction of the corresponding mono-olefine e.g. butene or methyl butene, in the vapour phase with molecular oxygen over a catalyst comprising antimony oxide at an elevated temperature. This process may be carried out in any suitable manner for example, in a fixed or fluidised bed reactor at temperatures preferably below 500° C. and particularly in the range 200 to 500° C. and under pressures which may be atmospheric, subatmospheric or superatmospheric. A preferred catalyst comprises (i) a mixture of the oxides of antimony and tin and/or (ii) a compound of antimony, tin and oxygen.

It has now been found that this process may be operated under a particular range of conditions with consequent advantages particularly with respect to increasing the operating time between regenerations of the catalyst employed.

Accordingly, the present invention is a process for the production of a conjugated diolefine which comprises reacting a mono-olefine the molecule of which contains a chain of not less than four carbon atoms, in the vapour phase with molecular oxygen in the presence of a solid catalyst at a temperature of at least 425° C. and under a pressure in the range 1 to 5 p.s.i.g.

The catalyst employed may comprise an oxide composition containing tin and antimony and be for example a composition prepared as described and claimed in British patent specification No. 902,952. Such catalysts may be promoted by the addition of other metal oxides e.g. iron oxide or bismuth oxide.

The reaction is carried out at a temperature of at least 425° C. and preferably at a temperature in the range 425 to 500° C. The contact time may be within the range 1 to 30 seconds.

In operation the mono-olefine in admixture with the oxygen may be brought into contact with the catalysts in any suitable manner e.g. in a fixed bed adiabatic or multi-tubular reactors or in a single or multistage fluidised bed reactor under isothermal or adiabatic conditions.

The proportion of mono-olefine in the feed may vary within fairly wide limits, but it is preferred to operate within the range 1% to 25% by volume. It is preferred to use butene-1, or butene-2, 2-methylbutene-1 and 2-methylbutene-2 as olefine starting materials in the process, butene being converted to butadiene and the methylbutenes to isoprene.

The proportion of oxygen in the feed may vary within fairly wide limits, for instance between 5% and 21% by volume of the reaction mixture, but in any case the concentration of oxygen in the gaseous reaction product after condensation of water and other liquid products should not be less than about 3%. The feed also contains a diluent which is preferably substantially inert under the conditions of the reaction, and which may be, for example, nitrogen, steam or paraffins e.g. n-butane. It is preferred to use a mixture of nitrogen and steam as diluent, and the oxygen may thus conveniently be supplied in the form of air.

The conjugated diolefines formed in reactions according to this invention may be recovered by any suitable means, for example by extraction into an organic solvent, or by condensation, if necessary with freezing, and fractionation of the product.

The invention is illustrated further by reference to the following example.

EXAMPLE

A tubular reactor packed with a tin oxide/antimony oxide catalyst prepared as described and claimed in British specification No. 902,952 was fed with a commercial mixture of butenes (13 parts by volume), air (60 parts by volume), steam (27 parts by volume) and maintained at a reaction temperature of 435° C. and at various inlet pressures for separate runs. Each run was continued for 96 hours after which time the amount of carbon deposited on the catalyst was determined. The following table shows the results obtained.

| Reactor inlet pressure p.s.i.g. | Percent weight of carbon deposit on catalyst after 96 hours |
|---|---|
| 9.7 | 4.5 |
| 7.8 | 3.9 |
| 5.8 | 0.16 |
| 3.9–2.9 | 0.015 |

The above results clearly demonstrate that by operation in accordance with the invention the amount of carbon deposited on the catalyst is significantly reduced.

I claim:
1. A process for the production of a conjugated diolefine which comprises reacting a mono-olefine the molecule of which contains a chain of not less than four carbon atoms, in the vapour phase with molecular oxygen over a fixed bed catalyst comprising a mixture of the oxides of antimony and tin or a compound of antimony, tin and oxygen at a temperature of at least 425° C. and under a pressure in the range 1 to 5 p.s.i.g.
2. A process as claimed in claim 1 wherein the reaction temperature is in the range 425 to 500° C.
3. A process as claimed in claim 1 wherein the proportion of mono-olefine in the feed is within the range 1% to 25% by volume.
4. A process as claimed in claim 1 wherein the proportion of oxygen in the feed is between 5% and 21% by volume.

5. A process as claimed in claim 4 wherein sufficient oxygen is present in the feed to enable free oxygen in amount not less than about 3% by volume to be present in the quenched reaction product.

6. A process as claimed in claim 1 wherein the mono-olefine is butene-1, butene-2, 2-methyl butene-1 or 2-methyl butene-2.

7. A process as claimed in claim 1 wherein the catalyst is promoted by the addition of iron oxide or bismuth oxide.

References Cited

UNITED STATES PATENTS

| | | |
|---|---|---|
| 3,159,688 | 12/1964 | Jennings et al. |
| 3,249,647 | 5/1966 | Dembinski. |
| 3,328,478 | 6/1967 | Barclay et al. |
| 3,342,890 | 9/1967 | Croce et al. |
| 3,375,291 | 3/1968 | Callahan et al. |

PAUL M. COUGHLAN, Jr., Primary Examiner